(12) United States Patent
Freytag et al.

(10) Patent No.: US 11,198,362 B2
(45) Date of Patent: Dec. 14, 2021

(54) VARIABLE CAPACITY FUEL TANK

(71) Applicant: AGCO International GmbH, Neuhausen (CH)

(72) Inventors: Erich Freytag, Sachsenried (DE); Guido Naegele, Marktoberdorf (DE); Andreas Dornach, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 230 days.

(21) Appl. No.: 16/534,594

(22) Filed: Aug. 7, 2019

(65) Prior Publication Data

US 2020/0047610 A1    Feb. 13, 2020

(30) Foreign Application Priority Data

Aug. 10, 2018   (GB) ..................... 1813051

(51) Int. Cl.
*B60K 15/073* (2006.01)
*B60K 15/03* (2006.01)

(52) U.S. Cl.
CPC ...... *B60K 15/073* (2013.01); *B60K 15/03177* (2013.01); *B60K 2015/03105* (2013.01); *B60K 2015/03171* (2013.01); *B60K 2015/03493* (2013.01); *B60Y 2200/221* (2013.01)

(58) Field of Classification Search
CPC .......... B60K 2015/03171; B60K 2015/03105; B60K 15/073; B60K 15/03177; B60K 2015/03493; B60Y 2200/221; B65D 21/086

USPC ...................... 220/723, 720, 564, 8; 137/571
See application file for complete search history.

(56) References Cited

U.S. PATENT DOCUMENTS

| 2,432,025 | A | | 12/1947 | Lorenz | |
|---|---|---|---|---|---|
| 4,852,765 | A | * | 8/1989 | Lyzohub | B60K 15/03177 220/560.03 |
| 5,398,839 | A | * | 3/1995 | Kleyn | B60K 15/03177 220/4.14 |
| 6,550,811 | B1 | * | 4/2003 | Bennett | B60K 15/03 180/314 |
| 2015/0076149 | A1 | * | 3/2015 | Roesler | B65D 25/14 220/212 |
| 2015/0151629 | A1 | | 6/2015 | Ooiwa | |
| 2016/0121712 | A1 | | 5/2016 | Ogiwara et al. | |
| 2018/0093780 | A1 | | 4/2018 | Melton et al. | |

FOREIGN PATENT DOCUMENTS

| DE | 10 2016 206478 A1 | 10/2017 |
|---|---|---|
| DE | 10 2017 008431 A1 | 3/2018 |
| EP | 3088231 A1 | 11/2016 |
| GB | 1205953 A | 9/1970 |
| KR | 19980044874 U | 9/1998 |

(Continued)

OTHER PUBLICATIONS

UK Intellectual Property Office, Search Report for UK Priority Application No. GB 1813051.8, dated Jan. 22, 2019.

(Continued)

*Primary Examiner* — Stephen J Castellano

(57) ABSTRACT

A fuel tank for a vehicle, having a plurality of chambers, the chambers fluidly connected to allow a flow of fuel between the chambers, where at least one of the chambers has a flexible fluid container contained within an expandable rigid outer shell.

9 Claims, 7 Drawing Sheets

(56) References Cited

FOREIGN PATENT DOCUMENTS

| | | |
|---|---|---|
| RU | 2 614 935 C1 | 3/2017 |
| SU | 1 093 632 A1 | 5/1984 |
| WO | 2019/170916 A1 | 9/2019 |

OTHER PUBLICATIONS

European Patent Office, Search Report for related EP Application No. 19186146.7, dated Jan. 7, 2020.

* cited by examiner

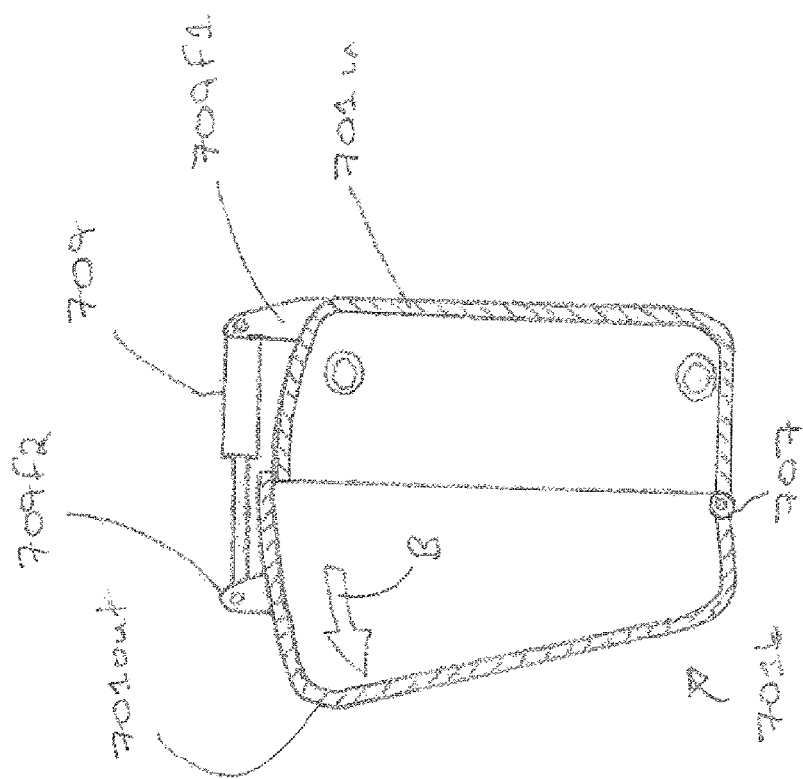
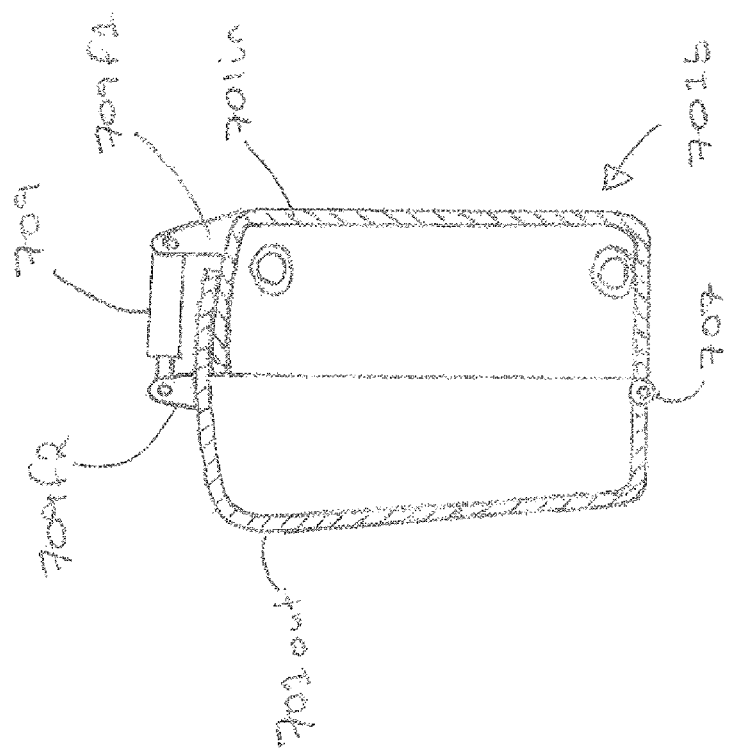
FIG. 7A
FIG. 7B

VARIABLE CAPACITY FUEL TANK

BACKGROUND

Field of Invention

The present invention relates to a fuel tank. In particular, the invention relates to a fuel tank for use with one of a range of similar vehicles of similar build but varying size. Such a fuel tank may be found in agricultural vehicles, such as tractors.

Discussion of Related Art

Certain types of vehicles, such as agricultural tractors, are typically manufactured in a range of sizes. As an example case, tractors come in a range of sizes, typically with different engine power and torque ranges for different purposes, such as from small 'narrow track' or vineyard tractors with sub-100 bhp engines to very large tractors with 500+ bhp engines. Accordingly, the space available for any particular component may vary. However, for reasons of economy of manufacture, it is advantageous if a range of tractors can be built with as many common components as possible, with a generally similar overall architecture.

Fuel tanks are one such component which may usefully be a common component across a range of tractors. This is particularly so for a vehicle like a tractor where the overall numbers manufactured are not especially high. Accordingly, the tooling costs to make a completely different fuel tank for every size of tractor may be comparatively high, and so there is a driver to attempt to use a common component across a range of tractor sizes, despite the varying size of the overall machine which may mean that the space available for that tank may vary.

It will be noted that although tractors are a good example for illustrating the problem, the problem may also readily occur in other areas of manufacture, particularly relatively low volume vehicle manufacture, such as low-volume automotive where a range of cars may preferably share a common fuel tank, although the space available for the fuel tank may vary across the range.

FIG. 1 shows a schematic top view of a typical spatial arrangement of some major components of a tractor.

FIG. 1 shows a fuel tank 101 of a tractor (generally indicated by dotted line 103). It can be seen that the fuel tank, in plan view, is generally 'L'-shaped, with a first portion 101a of the tank sitting generally within the body of the tractor and longitudinally between the front (105f) and rear (105r1/105r2) wheels of the tractor, and a second portion 101b of the tank sited laterally between the rear wheels (105r1 and 105r2) of the tractor. Depending on the size of the tractor (generally associated with the power of the tractor), the distance W between the rear wheels 105r1, 105r2 of the tractor varies from model to model, and so potentially the width W101b of the second portion 101b of the tank may also vary.

In order to accommodate and make best use of this varying width W101b, a present solution is to make the tank 101 in two physically separable pieces 101a and 101b, where 101a is common across the range of models and 101b is one of a purpose-made range of parts varying in size for each model of tractor. This is shown in FIG. 2, where parts 101a and 101b can be seen as separate parts. Second portion 101b of the tank is fitted to first portion 101a during manufacture and is joined volumetrically to first portion 101a by means of suitable female mating interfaces F1 and F2 with the male pipe extrusions 101p1 and 101p2 in a manner which will be readily understandable to those skilled in the art. As noted, the width W101b of tank section 101b will be one of a range of widths according to the model of tractor being manufactured.

The disadvantage of this arrangement is the requirement to have manufacturing facilities (typically blow-moulding moulds) available to produce a number of different sizes (widths) of tank section 101b, and the necessity to create and stock and keep track of the various sizes of tank.

A solution to these problems and an improved way of making best use of the space available for a fuel tank across a range of models of vehicle would be desirable.

BRIEF SUMMARY

Accordingly there is provided in an aspect;
a fuel tank for a vehicle, said fuel tank comprising a plurality of chambers, said chambers fluidly connected so as to allow a flow of fuel between the chambers, characterized in that at least one of the chambers comprises a flexible fluid container and said flexible fluid container is contained within an expandable rigid outer shell.

The advantage of this is that whereas first portion 101a of the fuel tank, which is a first chamber, may be a rigid common container across the vehicle model range (of, for example, a tractor range as described previously) as in prior art situations, the second portion 101b of the fuel tank, which is a second chamber, may now also be a common container which is usable across the vehicle model range. Because the space available varies from model to model, the second portion/chamber 101b of the fuel tank may be adjusted to fit the space available. The outer shell can be expanded outwards until it fits the space available, and the flexible fluid container may then be filled until it occupies the whole resultant volume, whatever that volume is. However, advantageously, only one version of tank portion 101b need be manufactured and stored for the whole vehicle range, saving on manufacturing set-up and logistics costs. Various known materials may be used for the flexible bag and the outer shell. The outer shell may be a 'blown' (blow-moulded) or injection moulded plastic item, or may be any other suitable material such as metal or carbon fibre.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIGS. 7A and 7B show an embodiment in cross-section with a second expandable fuel tank portion.

Corresponding reference characters indicate corresponding parts throughout the views of the drawings.

DETAILED DESCRIPTION OF EXEMPLARY EMBODIMENTS

Figure 2:
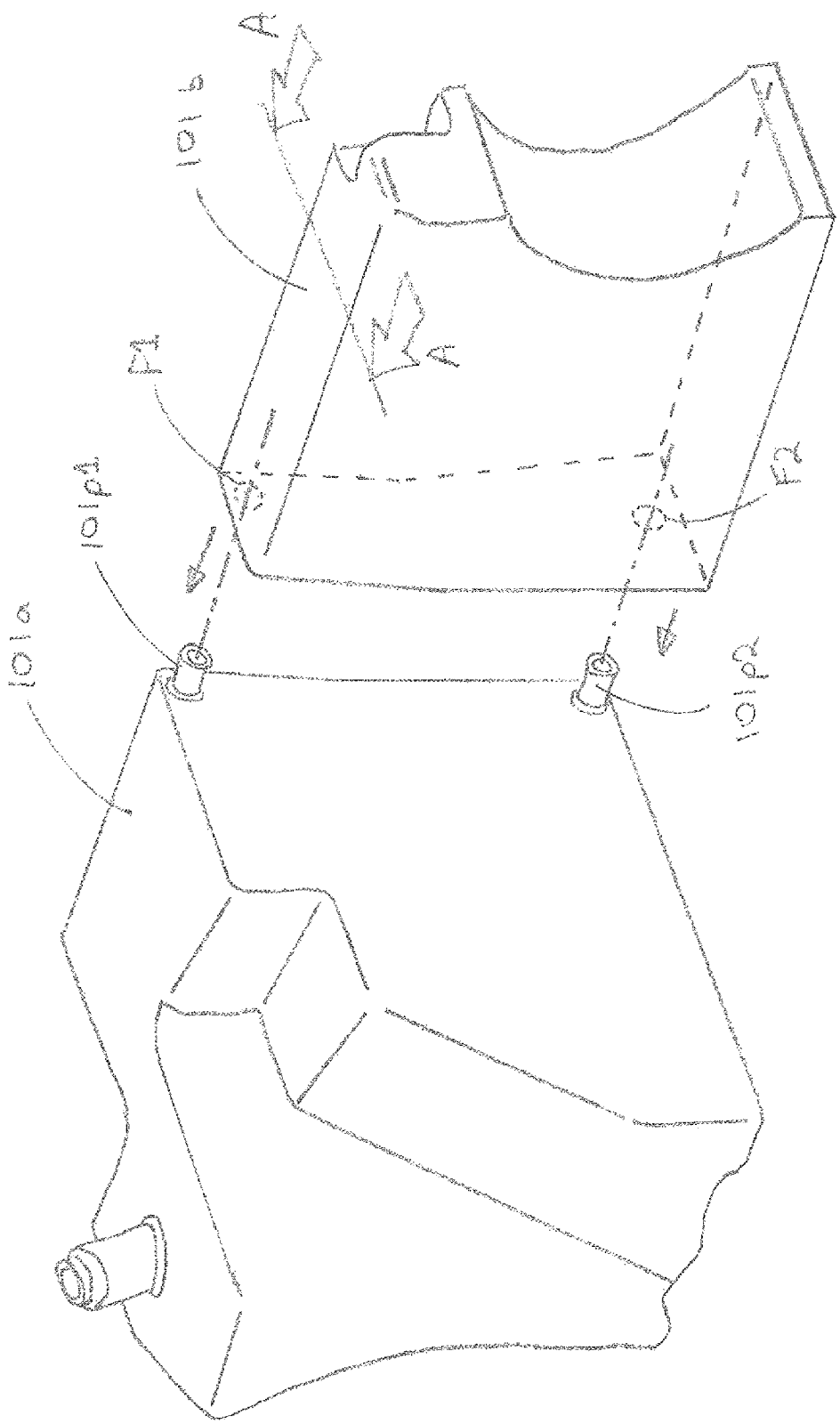
FIG. 2 shows the fuel tank in two physically separable pieces of a presently available tractor.
Figure 3:
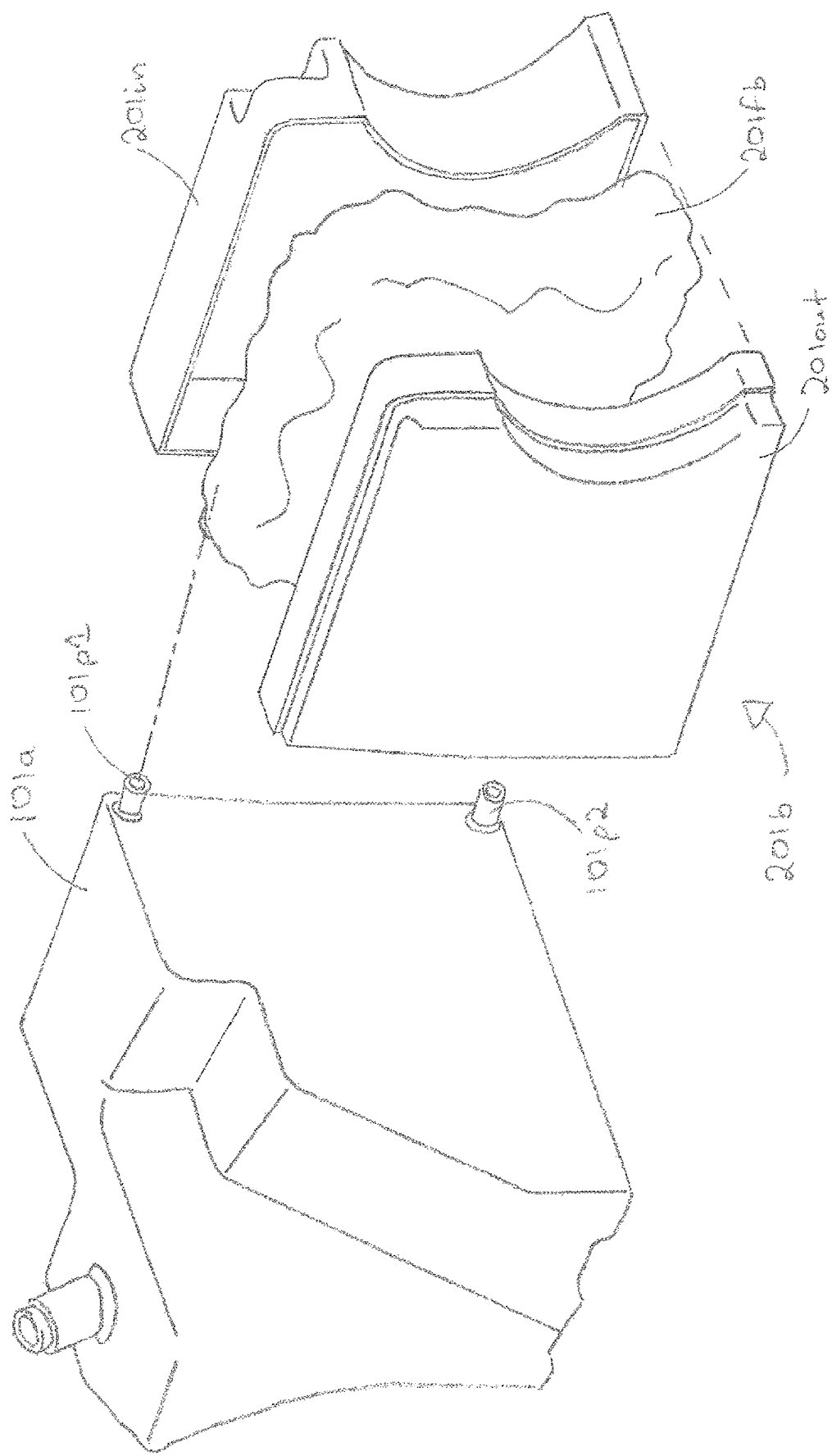
FIG. 3 shows an embodiment of the current invention.
Figure 4:
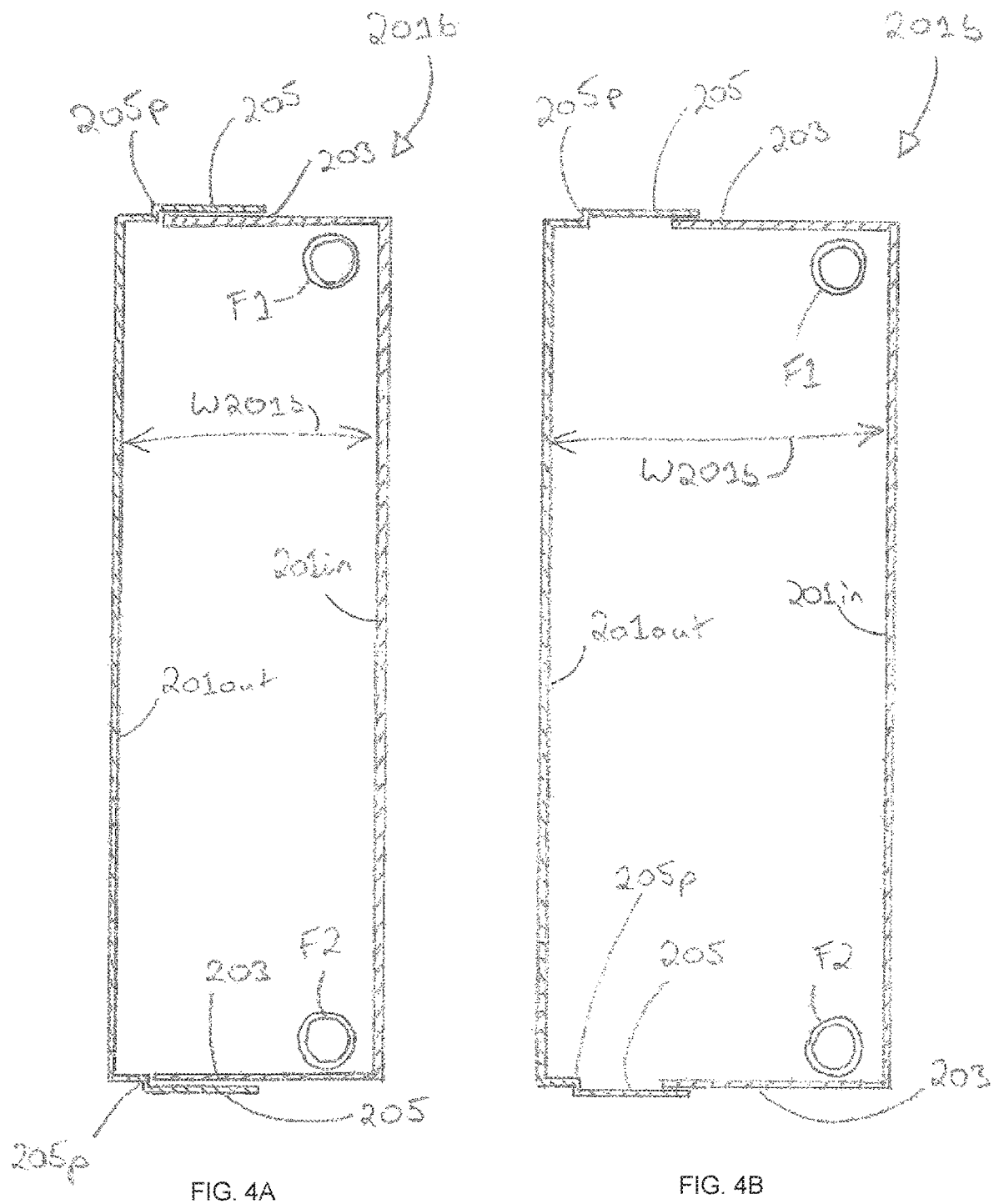
FIGS. 4A and 4B show an embodiment, in cross-sectional view in the direction of arrows A of FIG. 2.

FIG. 3 illustrates an embodiment of the invention. The first portion/chamber 101a of the fuel tank is a rigid container as previously described. The second portion 201b of the fuel tank (equivalent to portion 101b of the prior art), however, now comprises 3 pieces; a chamber comprising a flexible bag 201fb for holding fuel which joins onto the first portion 101a at the male pipe extrusions 101p1 and 101p2, and two rigid outer shell portions 201in and 201out which fit around the flexible bag 201fb. The outer shells 201in and 201out protect the flexible bag 201fb. Outer shells 201in and 201out cooperatively engage so that the total volume of the space made by 201in and 201out when they are fitted together is variable. This can be seen more clearly in FIG. 4A-B which is a cross-section through the outer shells 201in and 201out of tank portion 201b in the direction of arrows A of FIG. 2.

FIG. 4A shows shells 201in and 201out fitted together in a minimum volume configuration where the surface 203 of 201in is overlapped by the overlapping wall section 205 of 201out. The amount of overlap is constrained by step 205p in the wall of section 201out. Consequently the width W201b of portion 201b is at a minimum and this would be appropriate when the fuel tank is fitted to a smaller model of vehicle.

FIG. 4B shows the shells 201in and 201out fitted together in a larger volume configuration where the amount of overlap between surfaces 203 and 205 is lesser as the shell 201out is 'telescoped' out from shell 201in, expanding the tank portion 201b and increasing the available volume for flexible bag 201fb (not shown). The width W201b of the portion 201b is greater, and this makes use of a greater available space when the fuel tank is fitted to a larger model of vehicle.

The flexible bag chamber 201fb is able to fill the volume available in either configuration, and so its volume (and hence the chamber volume) varies depending on the set-up of rigid portions 201in and 201out.

It will be apparent to one skilled in the art that the invention may be embodied in further suitable ways. For example, first portion 101a of the fuel tank may also be made as an expanding container containing a flexible bag. The rigid outer shell of a portion may be made in 3 or more telescoping pieces and may even be constructed to telescope or expand in more than one direction. There may be 3 or more portions to the fuel tank, and all of these may telescope to fit a given set of potential volumes within a vehicle model range. Given the present inventive concept a person skilled in the art would readily be able to countenance such further derivations which are, nonetheless, encompassed by the inventive concept of the present application, even though they are not specifically illustrated in detail herein.

Figure 5:
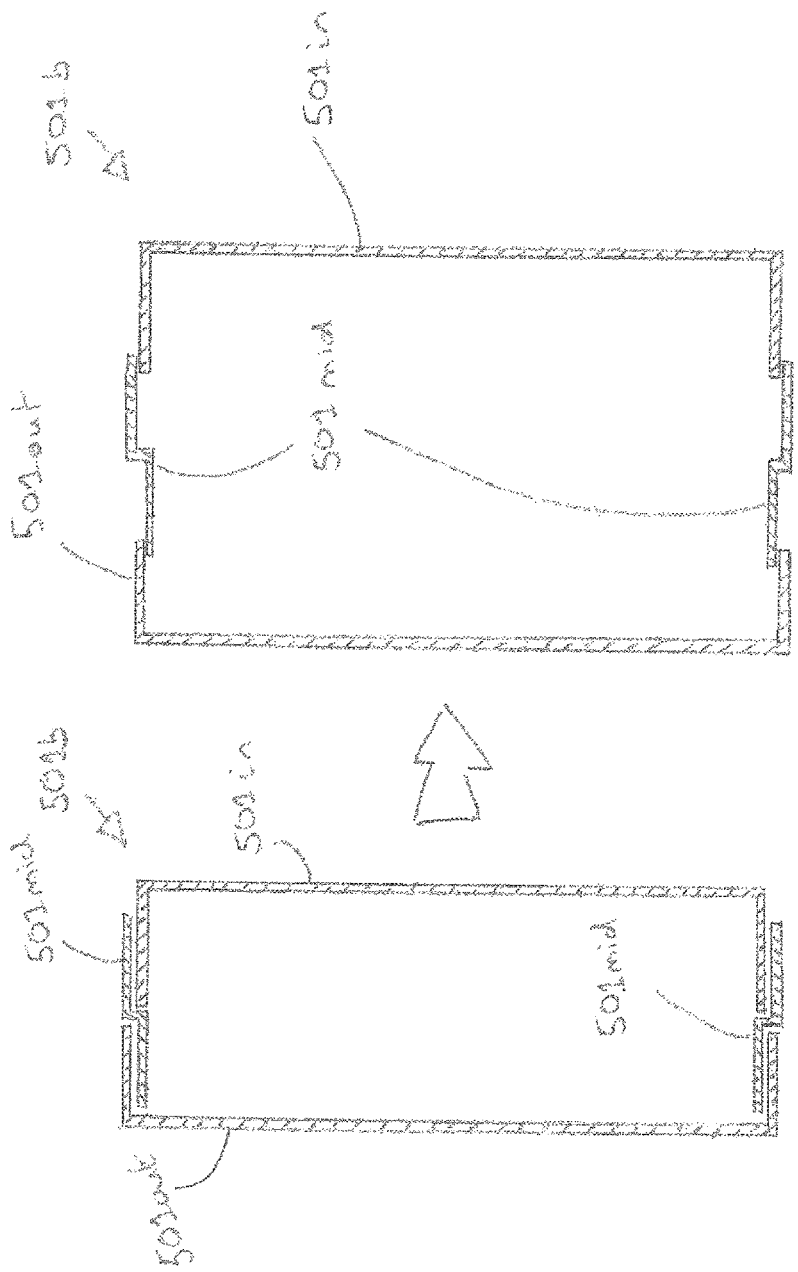
FIGS. 5A and 5B show a schematic embodiment, in sectional view, in direction of arrows A of FIG. 2.

FIGS. 5A and 5B show a schematic example embodiment, in sectional view, in direction of arrows A as per FIG. 2, where the rigid outer shell of the second portion 501b comprises three shell pieces 501in, 501mid and 501out. FIG. 5A shows the pieces in a minimum volume configuration, and FIG. 5B shows them in a larger volume configuration.

Figure 6:
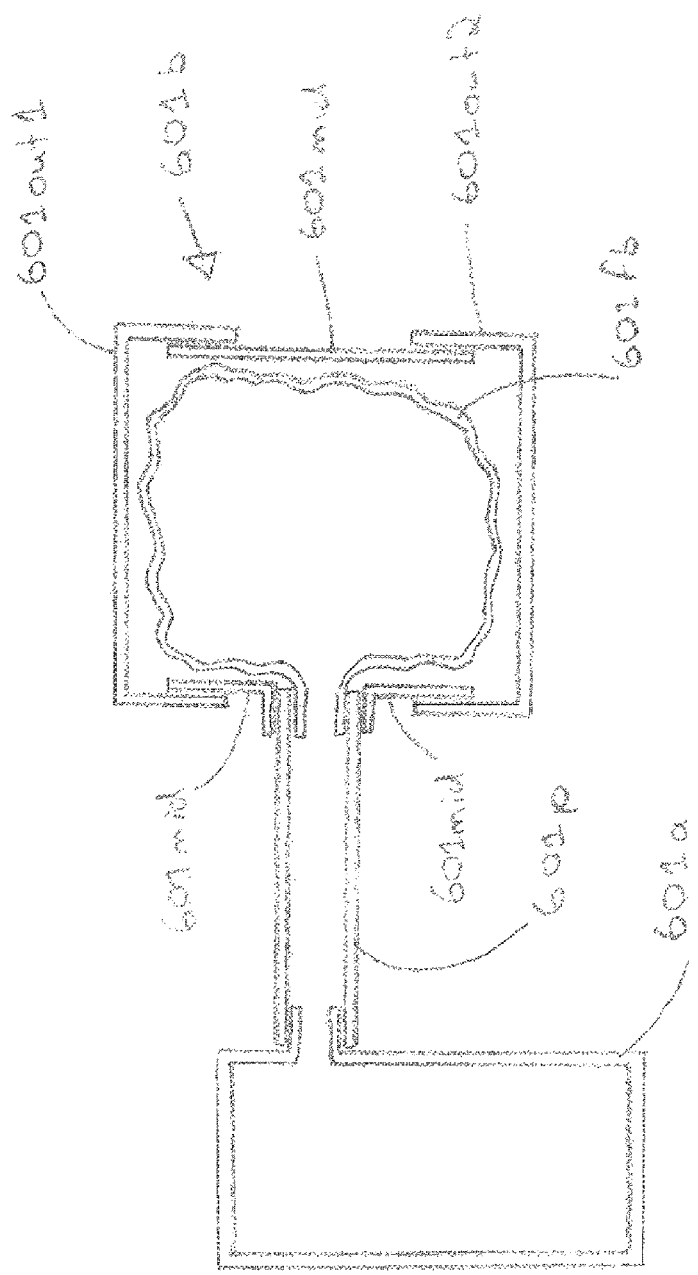
FIG. 6 shows a schematic embodiment, in sectional plan view, where the second chamber is remote from the first chamber.

FIG. 6 shows a schematic embodiment, in sectional plan view, where the second chamber 601b is relatively remote from the first chamber 601a as may be necessary in an alternate type of vehicle or in a vehicle where the space available for a tank is not in a single volume. It can be seen that first portion 601a is fluidly connected to the flexible bag chamber 601fb and the rigid outer shell 601out1, 601mid and 601out2 of the second portion 601b by means of a pipe section 601p in this embodiment. The skilled person will readily recognise the possibilities for volumetric expansion of second portion 601b and flexible bag 601fb afforded by the three shell components 601out1, 601mid and 601out2 of this embodiment.

Figure 1:
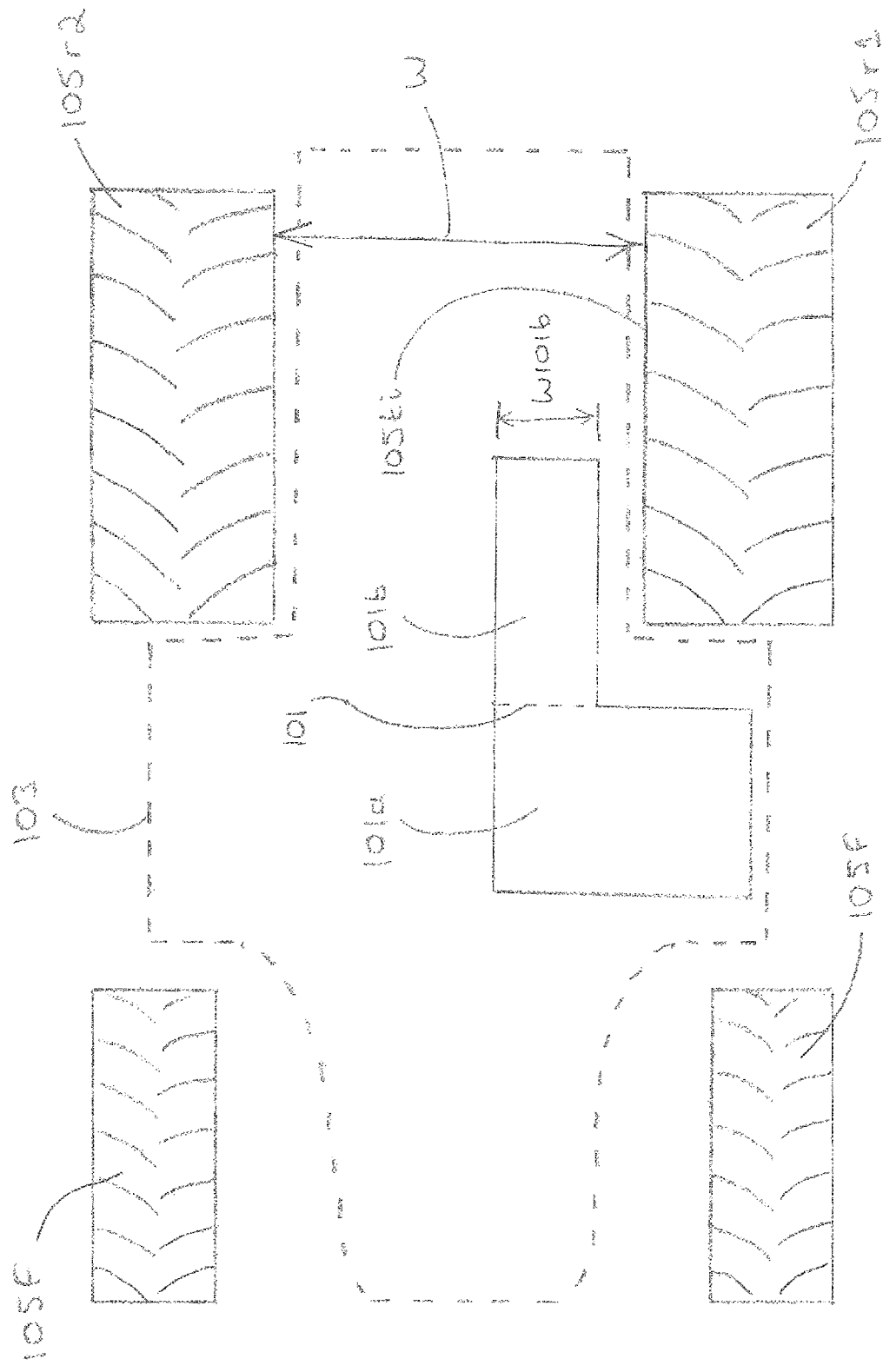
FIG. 1 shows a schematic top view of the typical spatial arrangement of the major components of a presently available tractor.

The invention also lends itself to further use cases. Thus far its utility in a manufacturing context has been considered, where a fuel tank can be tailored to fit an available space within a vehicle during manufacture, that space then remaining largely constant after manufacture for the remainder of the life of a vehicle. It would also be possible however to use a fuel tank as herein presented in a situation where a vehicle may have a variable amount of space during use. For example, agricultural tractors may be fitted with different wheel/tyre combinations when performing different tasks. Accordingly, the width W (as seen in FIG. 1) may also vary and thus the fuel tank portion width W101b can likewise for example, if so arranged, be varied. If the space-limiting factor which determines W101b is indeed for example the inner edge 105ti of wheel/tyre 105r1, then if this inner edge is further out during a particular agricultural task due to wheel/tyre 105r1 having been changed, then it would be advantageous to potentially expand the fuel tank portion 101b such that W101b is greater and more fuel is able to be put into the tank, thus for example increasing the working time of the vehicle before refuelling during that particular task. In this case, assuming that the fuel tank portion 101b is not physically restrained by some structural component, it would be advantageous to add some form of latching element so that the width W101b of the fuel tank portion 101b may be set by a user to a particular width. In a further embodiment, an actuator may be provided to easily and readily control the width W101b. For example, a hydraulic actuator (or actuators) may be controlled remotely from the fuel tank portion itself. This control may be in the cab of the vehicle or at any other hydraulic control point on the vehicle.

FIGS. 7A and 7B show an embodiment in cross-section wherein a second fuel tank portion 701b is provided in two rigid shell components 701in and 701out, connected at their bottom ends by a hinge 707. This would be provided with a flexible bag 701fb as in earlier embodiments, but this is not shown here. At the top end, hydraulic actuator 709 connects the rigid shell components via lugs 709f1 and 709f2 which are attached to components 701in and 701out respectively. As can be seen, when the actuator is retracted, the volume of the rigid shell of portion 701b is smaller (FIG. 7A) than when the actuator is extended (FIG. 7B) and outer shell component moves in the direction of arrow B. Unlike the embodiments of FIGS. 3, 4, 5 and 6, it can be seen that the embodiment of FIG. 7 expands in a non-telescopic manner. The skilled person would readily recognise various ways and means of controlling the actuator 709.

The invention may be further understood with the aid of the following paragraphs:

Para 1. A fuel tank for a vehicle,
said fuel tank comprising a plurality of chambers, said chambers fluidly connected so as to allow a flow of fuel between the chambers, characterized in that at least one of the chambers comprises a flexible fluid container and said flexible fluid container is contained within an expandable rigid outer shell.

Para 2. A fuel tank for a vehicle as described in para 1, wherein the expandable rigid outer shell comprises shell components which cooperatively engage such that one shell component has a wall section which overlaps a wall section of the other shell component.

Para 3. A fuel tank as described in para 1 wherein the expandable rigid outer shell is provided with a latch mechanism to lock the rigid outer shell into any one of a plurality of expanded positions.

Para 4. A fuel tank as described in para 1 wherein the expanding rigid outer shell is provided with an actuator arranged to controllably expand the rigid outer shell.

Para 5. A fuel tank as described in para 4 wherein the actuator is a hydraulic actuator.

Para 6. A fuel tank as described in para 1 wherein the expansion of the rigid outer shell is by means of a telescoping action.

Para 7. A fuel tank as described in para 1 wherein the rigid outer shell comprises plastic or blown plastic or injection moulded components.

Para 8. A fuel tank as described in para 1 wherein the vehicle is an agricultural vehicle.

Para 9. A fuel tank as described in para 1 wherein the vehicle is an agricultural tractor.

Clearly the skilled person will recognise that various aspects, embodiments and elements of the present application, including as illustrated in the figures, may be arranged in differing combinations, any and all of which may be considered to fall within the ambit of the inventive concept. The invention will be defined by the following claims.

The invention claimed is:

1. A fuel tank for a vehicle, the fuel tank comprising a plurality of chambers, the chambers fluidly connected to allow a flow of fuel between the chambers, wherein at least one of the chambers comprises a flexible fluid container within an expandable rigid outer shell, wherein the expandable rigid outer shell comprises a latch mechanism to lock the rigid outer shell into any one of a plurality of expanded positions.

2. The fuel tank as claimed in claim 1, wherein the expandable rigid outer shell comprises two or more shell components which cooperatively engage such that one shell component has a wall section which overlaps a wall section of an adjacent shell component.

3. The fuel tank as claimed in claim 1, wherein the expansion of the rigid outer shell is by telescoping action.

4. The fuel tank as claimed in claim 1, wherein the rigid outer shell comprises plastic components.

5. A fuel tank for a vehicle, the fuel tank comprising a plurality of chambers, the chambers fluidly connected to allow a flow of fuel between the chambers, wherein at least one of the chambers comprises a flexible fluid container within an expandable rigid outer shell, wherein the expandable rigid outer shell comprises an actuator configured to controllably expand the rigid outer shell.

6. The fuel tank as claimed in claim 5, wherein the expandable rigid outer shell comprises two or more shell components which cooperatively engage such that one shell component has a wall section which overlaps a wall section of an adjacent shell component.

7. The fuel tank as claimed in claim 5, wherein the actuator is a hydraulic actuator.

8. The fuel tank as claimed in claim 5, wherein the expansion of the rigid outer shell is by telescoping action.

9. The fuel tank as claimed in claim 5, wherein the rigid outer shell comprises plastic components.

* * * * *